Patented Aug. 5, 1952

2,606,171

UNITED STATES PATENT OFFICE 2,606,171

POLYVINYL ALDEHYDE AND POLYVINYL ACETATE RESINS PLASTICIZED WITH 1,5-PENTANEDIOL DIESTERS OF KEROSENE OXIDATION ACIDS

Stanford J. Hetzel, Cheltenham, Pa., assignor to Sun Oil Company, Philadelphia, Pa., a corporation of New Jersey No Drawing. Application December 30, 1949, Serial No. 136,144

4 Claims. (Cl. 260—31.6)

This invention relates to plasticized polyvinyl aldehyde and polyvinyl acetate resin compositions, and to the use of 1,5-pentanediol diesters of kerosene oxidation acids as plasticizer in such compositions.

Kerosene oxidation acids are acids obtained by oxidation of kerosene, e. g. by air oxidation of kerosene under pressure in liquid phase in the presence of a suitable catalyst. Examples of oxidation methods that may be used are given in U. S. Patents 2,153,302 and 2,168,699. The average molecular weight of the acidic products of such oxidation may be varied by distillation of those products. Kerosene oxidation acids having average molecular weight about 160 may be advantageously used for preparation of 1,5-pentanediol esters.

1,5-pentanediol diesters of kerosene oxidation acids and a method for the preparation of such diesters are disclosed and claimed in applicant's copending application, Serial No. 46,185, filed August 25, 1948, now U. S. Patent 2,533,250, issued December 12, 1950. The product therein described is a light-red amber material having a boiling range at 4 mm Hg. of about 200° C.–250° C., a refractive index $N_D^{20°C.}$ of 1.4888, and a density $D_4^{20°C.}$ of 0.9927. Polyvinyl chloride resins plasticized with the above esters are disclosed and claimed in applicant's copending application Serial No. 46,190, filed August 25, 1948, now U. S. Patent 2,545,811, issued March 20, 1951.

According to the present invention, the esters are compounded with a resin selected from the group consisting of polyvinyl acetal, polyvinyl butyral, and polyvinyl acetate resins to form a composition comprising the resin plasticized with the esters.

The following examples illustrate the invention:

*Example I*

80 parts by weight of a resin, known commercially as Vinylite AYAF and consisting essentially of polyvinyl acetate, were fused on a 3" x 8" rubber mill, whose rolls were heated to 220–230° F. About 20 parts of the above described esters as plasticizer and about 1 part of magnesium stearate as lubricant were added to the fused resin. The resin and ester blended to form a homogeneous mixture. The mixture was sheeted off at 175–190° F. to give a plastic sheet having satisfactory tensile strength and appearance, and flexibility substantially increased over that of the unplasticized resin.

*Example II*

40 parts by weight of a polyvinyl butyral resin known commercially as Vinylite XYSG were mixed together with about 60 parts by weight of the esters above described and about 1 part of magnesium stearate. The mixture was then fused on a 3" x 8" rubber mill whose rolls were heated to about 250° F. The resin and ester blended to form a homogeneous mixture. The mixture sheeted off to give a plastic sheet having increased flexibility and satisfactory tensile strength and appearance.

The above examples show that the esters above described, in proportion sufficient to plasticize the resin, are compatible with polyvinyl acetate and polyvinyl butyral resin. The esters and resin may be compounded according to methods as practiced in the arts relating to the respective resins.

Polyvinyl acetal and polyvinyl butyral resins, where referred to in the present specification, are intended to indicate resinous materials obtained by reacting hydrolyzed polyvinyl acetate resin with acetaldehyde and butyraldehyde respectively in the manner well known in the art for preparation of such polyvinyl aldehyde resins, the ratio of the acetal portion of such resinous materials to the unconverted acetyl and hydroxyl portions thereof being of substantial magnitude and generally at least about one.

I claim:
1. A composition comprising a resin selected from the group consisting of polyvinyl acetal, polyvinyl butyral, and polyvinyl acetate resins, said resin plasticized with 1,5-pentanediol diesters of acids obtained by partial oxidation of kerosene.
2. Composition according to claim 1 wherein said resin is a polyvinyl butyral resin.
3. Composition according to claim 1 wherein said resin is a polyvinyl acetate resin.
4. Composition according to claim 1 wherein said resin is a polyvinyl acetal resin.

STANFORD J. HETZEL.

REFERENCES CITED

The following references are of record in the file of this patent:

UNITED STATES PATENTS

| Number | Name | Date |
|---|---|---|
| 2,339,387 | Endres | Jan. 18, 1944 |
| 2,397,612 | Lycan | Apr. 2, 1946 |
| 2,545,811 | Hetzel | Mar. 20, 1951 |